United States Patent [19]

Grosch et al.

[11] 4,227,563

[45] Oct. 14, 1980

[54] BEAD CONSTRUCTION FOR A HEAVY DUTY PNEUMATIC TIRE

[75] Inventors: Karl Grosch, Roetgen; Paul Moitzheim; Gert Schloesser, both of Aachen, all of Fed. Rep. of Germany

[73] Assignee: Uniroyal GmbH, Aachen, Fed. Rep. of Germany

[21] Appl. No.: 891,231

[22] Filed: Mar. 29, 1978

[30] Foreign Application Priority Data

Apr. 7, 1977 [DE] Fed. Rep. of Germany ....... 2715734

[51] Int. Cl.³ .......................... B60C 15/00; B60C 9/02
[52] U.S. Cl. .............................. 152/354 R; 152/362 R
[58] Field of Search ............. 152/362 R, 362 CS, 354, 152/353 R, 357, 374

[56] References Cited

U.S. PATENT DOCUMENTS

| | | | |
|---|---|---|---|
| 3,372,773 | 7/1968 | Warren et al. | 152/354 |
| 3,406,733 | 10/1968 | Boileav | 152/362 R |
| 3,682,223 | 8/1972 | Simpson | 152/356 |
| 4,029,137 | 6/1977 | Suydam | 152/362 R |
| 4,085,787 | 4/1978 | Maiocchi | 152/374 |

Primary Examiner—Richard A. Bertsch
Attorney, Agent, or Firm—Philip Rodman

[57] ABSTRACT

A heavy duty pneumatic tire is provided with bead cores of symmetrical or asymmetrical polygonal cross-sectional. Extending radially outwardly therefrom are apex strips of a hard rubber compound which contact the bead cores along their radially outwardly oriented faces. The apex strips have a width at least as great as the width of the bead cores measured in a selected direction, and have a height of not more than 1.5 times the width of the bead cores. The terminal ends of turnups formed by wrapping a carcass ply radially about the bead cores, and reinforcement strips are enveloped in cushion elements of a rubber material which are softer than the carcass ply and the apex strips. The apex strips have a markedly compact shape cross sectionally and form with the bead cores, rigid units through which stresses occurring in the carcass during tire operation can be transferred. Residual forces in the turnups and the reinforcement strips can be absorbed readily by the cushion elements to reduce the occurrence of fatigue cracks in the beads.

10 Claims, 3 Drawing Figures

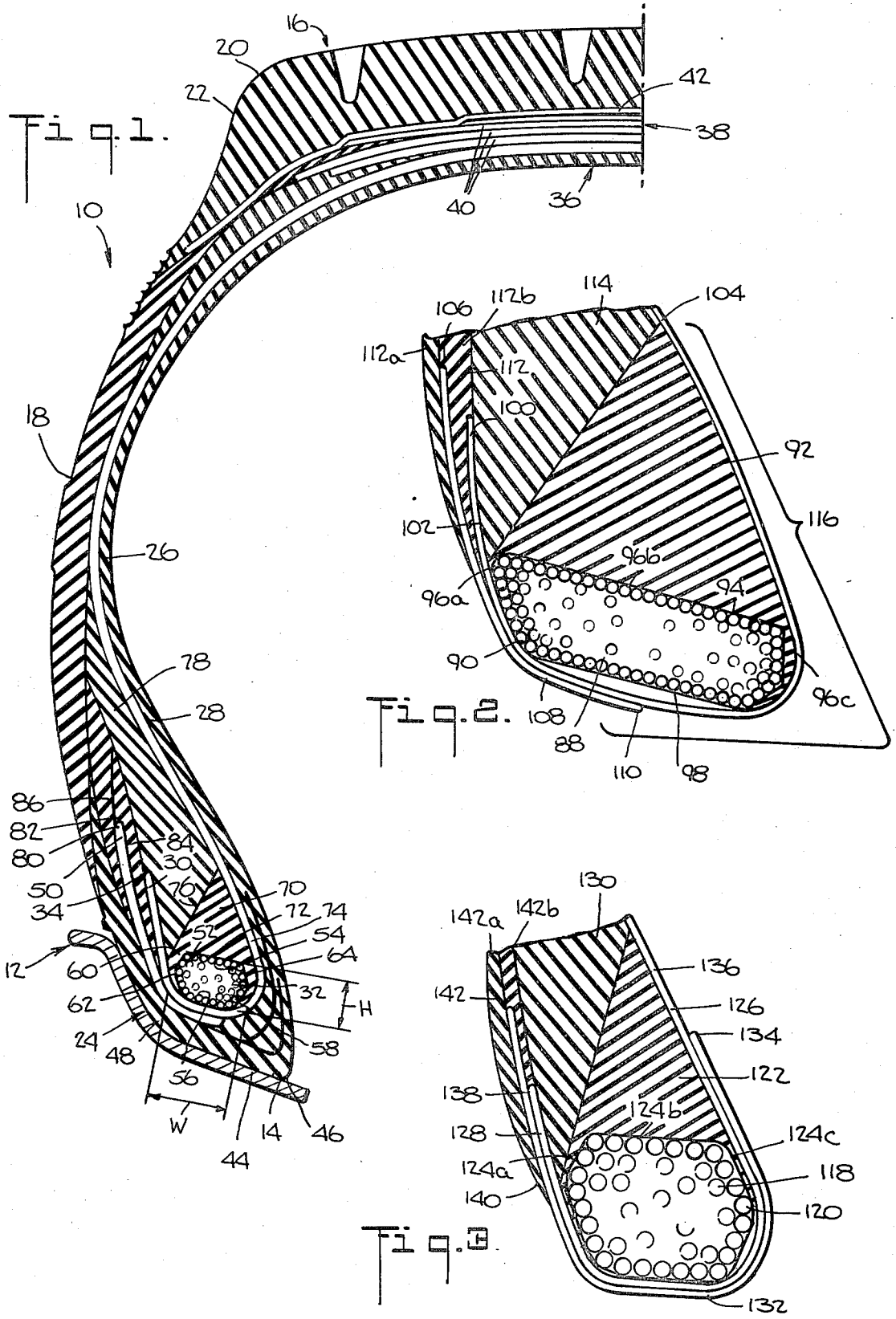

BEAD CONSTRUCTION FOR A HEAVY DUTY PNEUMATIC TIRE

BACKGROUND OF THE INVENTION

1. Field of the Invention

This invention relates to pneumatic tires and more particularly to a novel bead construction for heavy duty pneumatic tires.

2. Prior Art

Generally, heavy duty or high load bearing pneumatic tires include a radial carcass having at least one ply of rubberized steel cord fabric wrapped about a pair of bead cores formed from wires to create carcass flippers or turnups. Bead reinforcement strips are arranged in a folding zone and extend radially outwardly beyond the turnups, and are usually separated therefrom by rubber masses. Positioned above each bead core and extending radially outwardly therefrom between the turnups and the carcass ply is an apex strip of a hard rubber compound.

To guarantee a reliable seating of the tire on a wheel rim which is usually tapered or steep shouldered, i.e., having a seating area sloped at 15° to the wheel axle, it is customary to wind or arrange the wires of the bead core in such a way that the bead core has a polygonal cross-sectional configuration. In order to reduce the manufacturing problems of such tires, it is known in the art to wrap the wires of the bead core with a rubber mass tending to transform the polygonal cross-section into a rounded off overall cross-sectional configuration. Such a construction is disclosed in British Pat. No. 1,163,108, in which the bead core is assembled out of various components and is radially outwardly followed by a standard apex strip of substantially triangular cross-section, whose sides, oriented substantially radially, are considerably longer than its base which is in contact with the wire core. Such a compound bead core design is quite costly.

To be able to build a high load-bearing capacity tire with a bead core of substantially hexagonal cross-sectional configuration on standard flat drum machines, a strip made of hardenable, but not hardened, elastomer may be applied directly onto the radially outwardly situated area of the bead core with a sleeve of loose, rectangular-weave textile material placed around the core and the elastomer strip. The textile material consists preferably of a plastic material subject to shrinkage under the effect of heat. In German Pat. No. 2458423, a semicylindrical elastomer cover is used to supplement the hexagonal cross-section of the bead core so as to form a substantially oval-shaped cross-section. In this case, the transfer of forces from the tire to the rim could be considered to be satisfactory, however, the manufacture of such a bead is complicated and expensive.

Still other bead constructions are known in the art. For example, in U.S. Pat. No. 3,682,223 a bead construction is disclosed having a hard wedge shaped apex strip extending from each bead core and a soft cushion strip disposed between the apex strips and the carcass ply. In U.S. Pat. No. 3,392,773 the bead area is provided with a soft low modulus rubber compound extending from immediately adjacent the bead core to a point radially beyond the edge of an inextensible ply located in the lower sidewall area by using a soft rubber compound as a bead filler and a ply edge gum strip on the edge of the inextensible ply. Other constructions call for elements of various hardness for enveloping the edges of the plies and for acting as bead fillers, e.g., U.S. Pat. No. 3,727,568 and U.S. Pat. No. 3,921,693.

The bead constructions known in the art have the drawback that they are susceptible to premature fatigue cracks in the area of the turnup and/or the bead reinforcement strip, which area constitutes a weak point in the bead. Stability in the bead is unsatisfactory because bead cores and apex strips of known construction will not optimally attenuate or absorb the energy of deformation created in the tire under operating conditions, and because the residual energy of deformation at the turnup or bead reinforcement strip end is excessive and is being dispersed poorly.

It is toward elimination of these and other drawbacks that the present invention is directed.

SUMMARY OF THE INVENTION

1. Purposes of the Invention

It is an object of the present invention to provide a pneumatic tire having improved stability in the bead.

Another object of the present invention is to provide a pneumatic tire having increased flexibility in the area of the terminal edges of the turnup and bead reinforcement.

A further object of the present invention is to provide a pneumatic tire having improved stability in its bead through a novel bead design which is of simpler construction and less costly than current constructions.

Still other objects and advantages of the present invention in part will be obvious and in part will become apparent as the description proceeds.

2. Brief Description of the Invention

Generally, in accordance with the present invention, a heavy duty pneumatic tire is provided with a pair of beads each having a heel and a toe edge defining a seat. Each bead also includes a bead core of symmetrical or asymmetrisectional configuration formed from a multiplicity of wires and having a width measured in a direction parallel to the seat greater than its height which is measured in a direction perpendicular to the seat. At least one ply of rubberized steel cord reinforced fabric forming a carcass has its radially inward ends wrapped about the bead cores to form turnups. The terminal edges of the turnups extend radially outwardly of the bead core and are spaced axially outwardly of the carcass. Bead reinforcement strips are wrapped about the bead cores and extend radially outwardly beyond the terminal ends of the turnups. The reinforcement strips may contact the turnups throughout their lengths or may be spaced axially therefrom.

An annular apex strip of a hard rubber compound extends radially outwardly from each bead core. The apex strip is generally of triangular cross-sectional configuration and bears against the radially outwardly facing surfaces of the bead core. Accordingly, the minimum width of the apex strip is at least, slightly greater than the width of the bead core. The height of the apex strip in accordance with the present invention is not more than 1.5 times the width of the bead core and preferably is between about 0.75 and 1.0 times the width. As a result, the apex strip has short sides when compared to conventional apex strips.

A cushion element of a compound softer than the carcass and the apex strip is formed from filler elements which separate the turnups from the apex strip and which may separate the turnups from the reinforcement strips.

The compact unit formed by the bead core and the apex strip makes possible a favorable plane of shear between the reinforcement cords in the carcass ply and the unit itself. Consequently, shearing stresses can be absorbed by the unit without any major deformation. Neither the turnup nor the bead reinforcement strip is in contact with the hard rubber of the apex strip. Rather, the radially outer areas of the turnup and of the bead reinforcement strip are embedded in a soft rubber cushion made up of an adhesive rubber compound. Because of the relative softness of the rubber cushion, residual forces are kept at a minimum and are favorably reduced or absorbed as a result of its rebound elasticity property.

According to the present invention, deformation of the bead core and the apex strip is minimized. The energy of deformation is low at the terminal edges of the turnup and the reinforcement strips, and the formation of fatigue cracks in the bead is reduced.

The invention consists of the features of construction and arrangement of parts which will be detailed hereinafter and described in the appended claims.

BRIEF DESCRIPTION OF THE DRAWINGS

While the specification concludes with claims particularly pointing out and distinctly claiming the subject matter regarded as the invention herein, it is believed that the invention will be better understood from the following description when read in conjunction with the accompanying drawings, in which:

FIG. 1 is a partial cross-sectional view of one half of a pneumatic tire constructed in accordance with one embodiment of the present invention;

FIG. 2 is an enlarged cross-sectional view of a portion of the bead area of a pneumatic tire constructed in accordance with an alternative embodiment of the present invention; and FIG. 3 is a view similar to FIG. 2 showing a further embodiment of the present invention.

DESCRIPTION OF THE PREFERRED EMBODIMENTS

As used in the specification and the claims, the terms "axially inward" and "axially outward" are used with reference to a sidewall of the tire, that is, "axially inward" refers to a vector extending from the sidewall to the opposite sidewall. Conversely, "axially outward" refers to a vector extending outwardly away from the sidewall. The terms "radially inward" and "radially outward" are used with reference to the axis of rotation of the tire, that is, "radially inward" refers to a vector extending from the tread profile of the tire to the axis, while, the term "radially outward" refers to a vector extending from the axis toward the tread profile.

With reference to FIG. 1, there is illustrated one half of a tire 10 constructed in accordance with one embodiment of the present invention. While only one-half of the tire section is illustrated, it is to be understood that the half not illustrated is the same as that illustrated, but opposite in hand.

The tire 10 is a high load carrying capacity tubeless pneumatic tire for use on trucks, heavy duty and/or large-size vehicles. It is designed to be mounted on a steep shoulder rim 12 which has a seating area 14 sloped at an angle of 15° to the wheel axle. The tire 10 includes a ground engaging tread profile 16 which extends circumferentially of the tire 10 and a sidewall portion 18 which extends from the lateral edge 20 of the tread portion or shoulder 22 radially inwardly to a bead 24. A carcass 26 of at least one ply 28 of rubberized steel cord reinforced fabric has its radially inward end or turnup portion 30 wrapped about an inextensible bead core 32. The terminal edge 34 of the turnup 30 extends radially outwardly of the bead core 32 and is spaced axially outwardly from the carcass 26.

In the crown area 36 of the tire 10 there is arranged a belt like reinforcement 38 which extends circumferentially about the tire between the carcass 26 and the tread portion 16. The reinforcement 38 may include a plurality of rubberized steel cord plies 40 radially covered by a protective ply 42 of steel fabric.

When the tire is in normal operation, the bead 24 is mounted on the rim 12 so that the seating area 14 engages and supports the radially inward side or seat 44 of the bead.

In the particular embodiment illustrated in FIG. 1, the bead 24 terminates at a toe 46 at its radially and axially innermost edge and at a heel 48 at its radially innermost, axially outermost edge. Forming generally radially outward extensions of the turnup 30 is at least one reinforcement strip 50 consisting of a ply of rubberized steel cord fabric wrapped about the bead core 32.

The bead core 32 is of a polygonal cross-sectional configuration, preferably an asymmetrical hexagonal cross-sectional configuration. It is made from a multiplicity of wires 52 wound in an orientation perpendicular to a vertical plane passing through the bead core, i.e., the wires 52 are oriented concentrically to the circumference of the rim 12 without any helical twist. This imports to the bead core a considerably rigidity. Other types of bead core constructions known in the art, e.g., stepped laminated or compound wires may be employed in the present invention, however, the concentrically wound wire construction is preferred.

The bead core 32 is designed to extend parallel to the seat 44 of the bead. As noted hereinabove, the bead core 32 is asymmetric in cross-section and has a width W, measured in a direction parallel to the seat 44 greater than its height H, measured in a direction perpendicular to the seat.

The bead core 32 is oriented so that its longest sides or faces 54 and 56 are parallel to the seat 44. The shortest face 58 of the bead core is oriented in the direction of the bead toe 46, and is parallel to its corresponding short side 60. The remaining two faces 62 and 64 are parallel to each other with the face 62, oriented in close proximity to the heel 48 of the bead.

Also contained in the bead is an annular apex strip 70 made of hard rubber which extends circumferentially of the tire and radially of and from the bead core 32. In the particular embodiment illustrated in FIG. 1, the apex strip 70 has a Shore A hardness of about 80°. The apex strip 70 is of a generally triangular cross-sectional configuration, and along its base 72, bears directly against the radially outwardly oriented faces 54, 60 and 64 of the bead core so that the bead core and apex strip make contact over a substantial area. Accordingly, the maximum width of the base 72 taken along a line parallel to the seat 44 is at least slightly greater than the parameter W of the bead core. The height of the apex strip measured in a direction substantially perpendicularly to the seat 44 is not greater than 1.5 times the width of the bead core. Preferably, the height is between approximately 0.75 and 1.0 times the width. An apex strip of such a height has a shorter radial extent than conventionally designed apex strips. Accordingly, the sides 74 and 76 of the apex strip are shorter than those found on apex strips of conventional construction.

The carcass ply 28 is in contact with the apex strip 70 along its side 74, and also along the entire lower half, i.e., the radially inward faces 56, 58 and 62, of the bead core 32. The radially outer portion of the turnup is, however, not in contact with the apex strip 70, but a first filler element 78 is provided to separate the turnup 30 from both the apex strip 70 and the carcass ply 28.

As mentioned hereinabove, there is provided a reinforcement strip 50 in the bead. The reinforcement strip 50 begins at a point proximate the midpoint of the seat 44 and extends past the heel 48 to a point 80 radially outwardly of the terminal edge 34 of the turnup 30. As shown in FIG. 1, the terminal edge 82 of the reinforcement strip 50 is spaced axially from the terminal edge 34 of the turnup 30 and a second filler element 84 is positioned therebetween. A third filler element 86 is positioned along the axially outward side of the reinforcement strip as shown.

The second and third filler elements 84 and 86 combine to form a cushion element extending into the sidewall of the tire of a soft rubber mass having a Shore A hardness in the range of from about 50 to about 65 and having a rebound elasticity according to DIN 53,512 in the range of from about 55 to about 65%. These elements possess a high adhesion to steel quality which aids in the prevention of deterioration and separation of the cords at the terminal edges 34 and 82, it being assumed for this discussion that the bead reinforcement strip 48 is of rubberized tire cord fabric.

In accordance with the construction set forth above, situated radially and axially outwardly of a unit consisting of the bead core and apex strip is an area of substantial radial length and axial width which is relatively soft in comparison to the bead core and apex strip. The unit is compact and rigid and is capable of absorbing a high portion of energy of deformation under operational loads and has a high resistance to twisting. This rigid unit guarantees that only a small portion of residual energy of deformation appears at the terminal edges of the turnup and reinforcement strip, the majority of the force being transferred along a path of shear, i.e., the plane of shear between the carcass ply and the unit from the tire to the rim. The energy of deformation which must be absorbed by the turnup and the reinforcement strip is reduced and can be readily absorbed by the cushion element. Consequently, the development of fatigue cracks in the bead area is reduced considerably, and the service life of the bead area is substantially improved.

An alternative bead construction is illustrated in FIG. 2, and includes an annular bead core 88 composed of a multiplicity of wires 90 which is designed to be approximately hexagonal in cross-sectional configuration. The bead core 88 might also be characterized as being of an unevenly extended rectangular cross-sectional configuration. As in the first embodiment discussed hereinabove, an apex strip 92 of a hard rubber compound extends radially outwardly from the bead core 88, with its base 94 contacting the radially outwardly oriented faces 96a, b and c of the bead core 88. As shown, face 96b is the largest, and face 96a is the smallest face of the core. The height of the apex strip 92 measured in a direction perpendicular to the face 98 of the bead core 88 which is parallel to the seat of the bead (not shown), is smaller than its width measured in a direction parallel to the face 98. The terminal end 100 of the turnup 102 formed by wrapping a carcass ply 104 of rubberized tire cords about the bead core 88 as well as the terminal end 106 of a reinforcement strip 108 which originates in the sole area 110 of the bead are encased in a cushion element 112 of a soft rubber compound. In this embodiment, the terminal end 100 of the turnup 102 and the terminal end 106 of the reinforcement strip 108 are spaced axially from each other within the cushion element 112 formed by strips 112 and 112b. The turnup 102 is separated from the carcass ply by a filler element 114.

In accordance with this embodiment, the reinforcing cords in the carcass ply, along with the rigid unit formed by the bead core 88 and the apex strip 92 create a long path or plane of shear whose extent is suggested by the bracket 116 so as to withstand deformation loads to which the tire is subjected.

In FIG. 3, another alternative embodiment is shown wherein the bead core 118 is designed from a multiplicity of wires 120 to have an asymmetric hexagonal cross-sectional configuration of a more conventional appearance than the previously discussed embodiments. A hard apex strip 122 contacts the bead core 118 substantially along the bead core's radially outwardly oriented faces 124a, b and c. As shown, the face 124b is larger than faces 124a and 124c. The size relationship of the apex strip 122 to the bead core 118 is the same in this embodiment as in those previously discussed.

A carcass ply 126 of cord reinforced fabric is wrapped about the bead core 118 to create a turnup 128 which is separated from the carcass ply by filler element 130. A reinforcement strip 132 is wrapped about the bead core 118 beginning at a point 134 on the axially inner surface 136 of the carcass ply 126 which is radially outwardly of the bead core 118, and extends radially outwardly of the terminal end 138 of the turnup 128. In this embodiment, the portion 140 of the reinforcement strip contacts the turnup 138 within the soft cushion element 142 formed by strips 142a and 142b.

In the last mentioned embodiment, as in the two embodiments discussed previously, the compact unit formed by the apex strip 122 and the bead core 118 is capable of withstanding extreme operational loads and whatever forces are transmitted to the turnup 128 and the reinforcement strip 132 are readily absorbed by the cushion element 142.

Tires embodying the above constructions can be retreaded two or three times before the appearance of fatigue phenomena in the bead area.

It can be seen from the foregoing that the objects of the present invention, namely to provide an improved bead construction for a heavy duty pneumatic tire have been achieved in a pneumatic tire having a pair of beads each formed with a heel and toe edge to define a seat and a bead core of an asymetrical polygonal cross-sectional configuration which has a selected width measured in a direction parallel to the seat. A carcass ply of rubberized cord fabric has its end portions wrapped radially about the bead cores to form turnups which are axially displaced from the remaining portions of the carcass. Reinforcement strips are wrapped about the bead core and form radially outward extensions of the turnups. The reinforcement strips may either contact the turnups or be spaced axially therefrom. Annular apex strips of a hard rubber compound with a substantially triangular cross-sectional configuration extend radially of and from the bead cores and contact the bead cores along their radially outwardly oriented faces. The apex strips have a width measured in a direction parallel to the seats of the beads of at least that of the bead cores and have a height measured perpendicularly to the seat, of no more than 1.5 times, and preferably from about 0.75 to about 1.0 times the width of the bead cores.

A cushion element of a soft rubber compound of high restorability envelopes the terminal ends of the turnups and the reinforcement strips.

The unit of the cross-sectionally polygonal bead core and the compact apex strip of hard rubber is capable of absorbing a high portion of the resultant energy of deformation without any inherent deformation. The residual energy of deformation is absorbed by the cushion element. By means of this arrangement, there is combined advantageously the effects of the rigid unit made up of the bead core and the apex strip and those of the adjoining cushion-shaped area consisting of soft rubber.

While in accordance with the patent statute, preferred and alternative embodiments have been described in detail, it is to be understood that the invention is not limited thereto or thereby.

What is claimed is:

1. A heavy-duty pneumatic tire for mounting on a 15° steep-shouldered rim comprising, in cross-section, a sidewall having an inside surface portion and an outside surface portion, a bead defined between said inside and said outside surface portions, said bead being formed with a heel at said outside surface portion and a toe-edge at said inside surface portion to define a seat, said bead including a bead core having an elongated hexagonal, cross-sectional configuration of unequal long sides oriented parallel to the seat and having a predetermined width when measured in a direction parallel to said seat, a carcass disposed between said inside and said outside surface portions, said carcass having at least one ply of rubberized steel cord fabric closer in proximity to the inside surface portion than the outside surface portion and having a terminal end portion turned up around said bead core a predetermined distance from said carcass and substantially parallel to said carcass and terminating radially above said bead core, a bead reinforcing strip of steel cord extending from the heel and having a terminal end radially above the terminal end of the carcass turnup, a tread forming a crown-like cover on the carcass, a reinforcement belt disposed between said tread and said carcass, said reinforcement belt being formed of rubberized steel cord, and a rubber filler assembly disposed between said inside and said outside surface portions and extending approximately from the bead core toward the tread, said filler assembly comprising an apex strip of hard rubber compound contacting said bead core and having converging side portions extending radially of and from said bead core, said apex strip having a height when measured in a direction perpendicular to said seat of no more than 1.5 times the width of said bead core and, together with the bead core, forming a rigid unit with said bead core, said bead core including rubberized steel wires extending perpendicular to axial planes of the tire and concentrically with respect to each other to form a rigid bead area providing a relatively short shear stress path, said filler assembly further including cushion elements formed of a soft rubber compound different from the rubber compound of said apex strip and being strongly adherent to steel and having high rebound elasticity, the terminal end of the carcass turn-up and the terminal end of the bead reinforcing strip being embedded in the cushion elements whereby the bead area is endowed with elastic rebound characteristics.

2. The pneumatic tire in accordance with claim 1 wherein said apex strips have a Shore A hardness of about 80°.

3. The pneumatic tire in accordance with claim 1 wherein said cushion elements have a Shore A hardness less than that of said apex strips and said carcass.

4. The pneumatic tire in accordance with claim 3 wherein said cushion elements have a Shore A hardness of between about 50° and about 65°.

5. The pneumatic tire in accordance with claim 4 wherein said cushion elements have a Shore A hardness of about 60°.

6. The pneumatic tire in accordance with claim 1 wherein said cushion elements have a rebound elasticity of about 55 to 65% determined according to German Industrial Standards DIN 53,512.

7. The pneumatic tire in accordance with claim 1 wherein said apex strips have a height of between approximately about 0.75 and about 1.0 times the width of said bead cores.

8. The pneumatic tire in accordance with claim 1 wherein said bead cores have a compressed hexagonal cross-sectional configuration with three radially outwardly oriented faces, one of said faces directed toward said heels as well as the faces parallel thereto of an average conventional length, one of said faces being parallel to said seats and having the greatest length, and one of said faces being of minimum length, said apex strips contacting said bead cores along said three radially outwardly oriented faces.

9. The pneumatic tire in accordance with claim 1 wherein the terminal edge of said carcass turn-up and the terminal edge of said reinforcement strip are axially spaced from each other while enveloped in said cushion elements.

10. The pneumatic tire in accordance with claim 1 wherein the terminal edge of said carcass turn-up is in contact with said reinforcement strip while enveloped in said cushion elements.

* * * * *